United States Patent [19]

Heshmat et al.

[11] Patent Number: 5,752,774
[45] Date of Patent: May 19, 1998

[54] ZERO CLEARANCE AUXILIARY BEARING FOR PROVIDING ROTOR SHOCK TOLERANCE

[75] Inventors: Hooshang Heshmat, Niskayuna; H. Ming Chen, Latham, both of N.Y.

[73] Assignee: Mohawk Innovative Technology, Inc., Niskayuna, N.Y.

[21] Appl. No.: 735,309

[22] Filed: Oct. 22, 1996

[51] Int. Cl.$^6$ ................................................. F16C 13/00
[52] U.S. Cl. ................................................ 384/549; 384/624
[58] Field of Search .................................. 384/624, 627, 384/549, 583, 519, 247, 253, 102; 310/90.5

[56] References Cited

U.S. PATENT DOCUMENTS

| | | |
|---|---|---|
| 2,674,445 | 4/1954 | Diehl ............................. 384/549 X |
| 3,247,601 | 4/1966 | Sims .............................. 384/549 |
| 3,295,801 | 1/1967 | McDowall et al. ............ 384/549 X |
| 4,445,792 | 5/1984 | Trippett ........................ 384/253 X |
| 4,926,493 | 5/1990 | Junker .......................... 384/549 X |
| 5,021,697 | 6/1991 | Kralick ......................... 384/624 X |
| 5,231,323 | 7/1993 | New .............................. 310/90.5 |
| 5,272,403 | 12/1993 | New .............................. 310/90.5 |

FOREIGN PATENT DOCUMENTS 2717835 12/1977 Germany ............................ 384/102

*Primary Examiner*—Thomas R. Hannon
*Attorney, Agent, or Firm*—Hodgson, Russ, Andrews, Woods & Goodyear LLP

[57] ABSTRACT

An auxiliary bearing for temporarily receiving rotor load when the main bearings are unable to receive rotor load. A plurality of rollers or sets of rollers are spaced circumferentially around the rotor. At least some of the rollers are movable between first radial positions which afford clearance between the rollers and the rotor and second radial positions for receiving by the rollers of rotor load. The movement of one roller toward the second radial position in response to contact therewith by the rotor effects movement of all of the at least some rollers toward the second radial positions to close the clearance and receive the rotor load. The rollers then disengage when the rotor load is again taken by the main bearings.

16 Claims, 14 Drawing Sheets

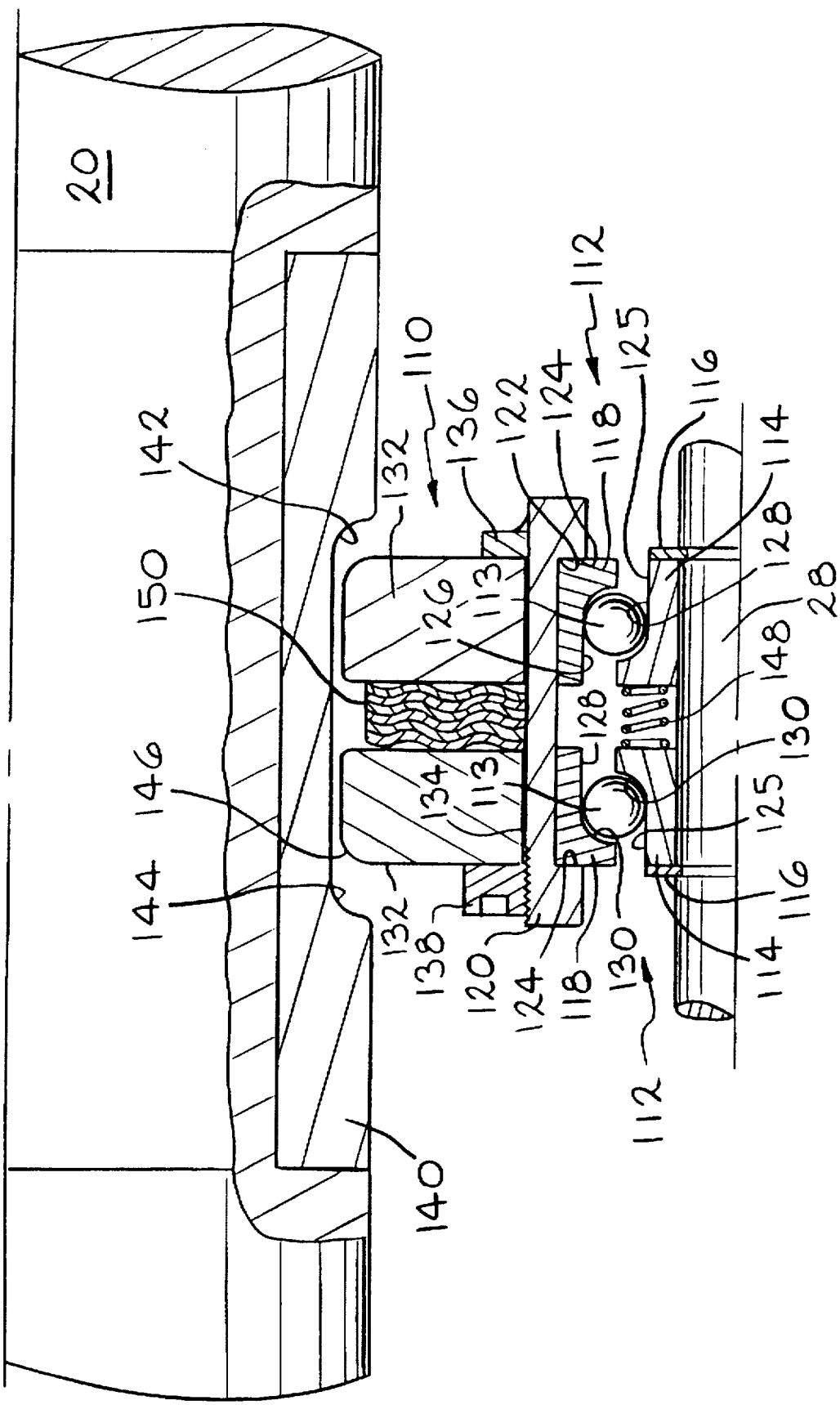

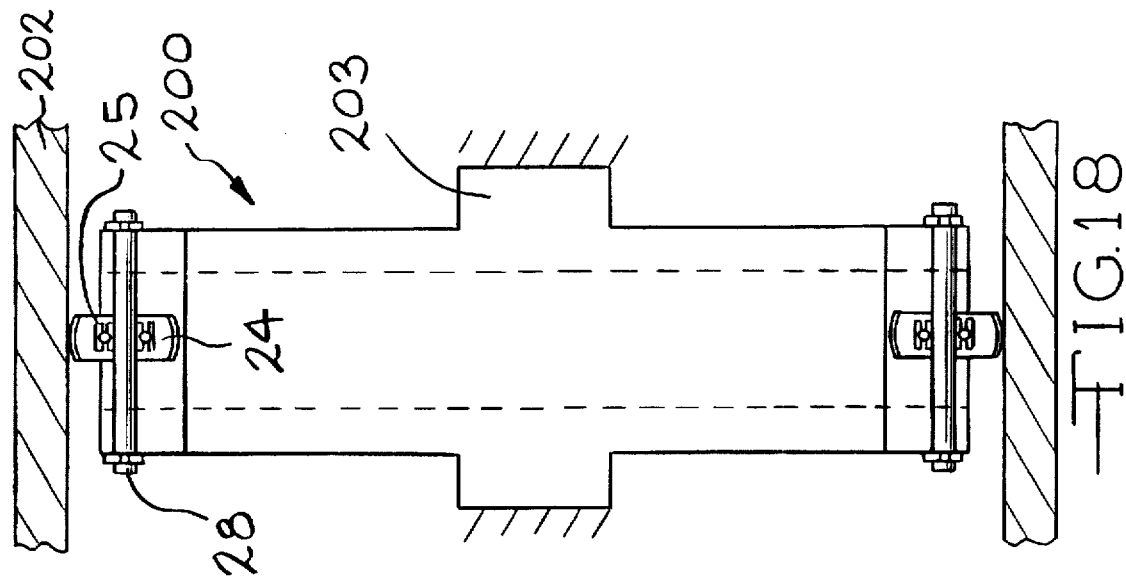
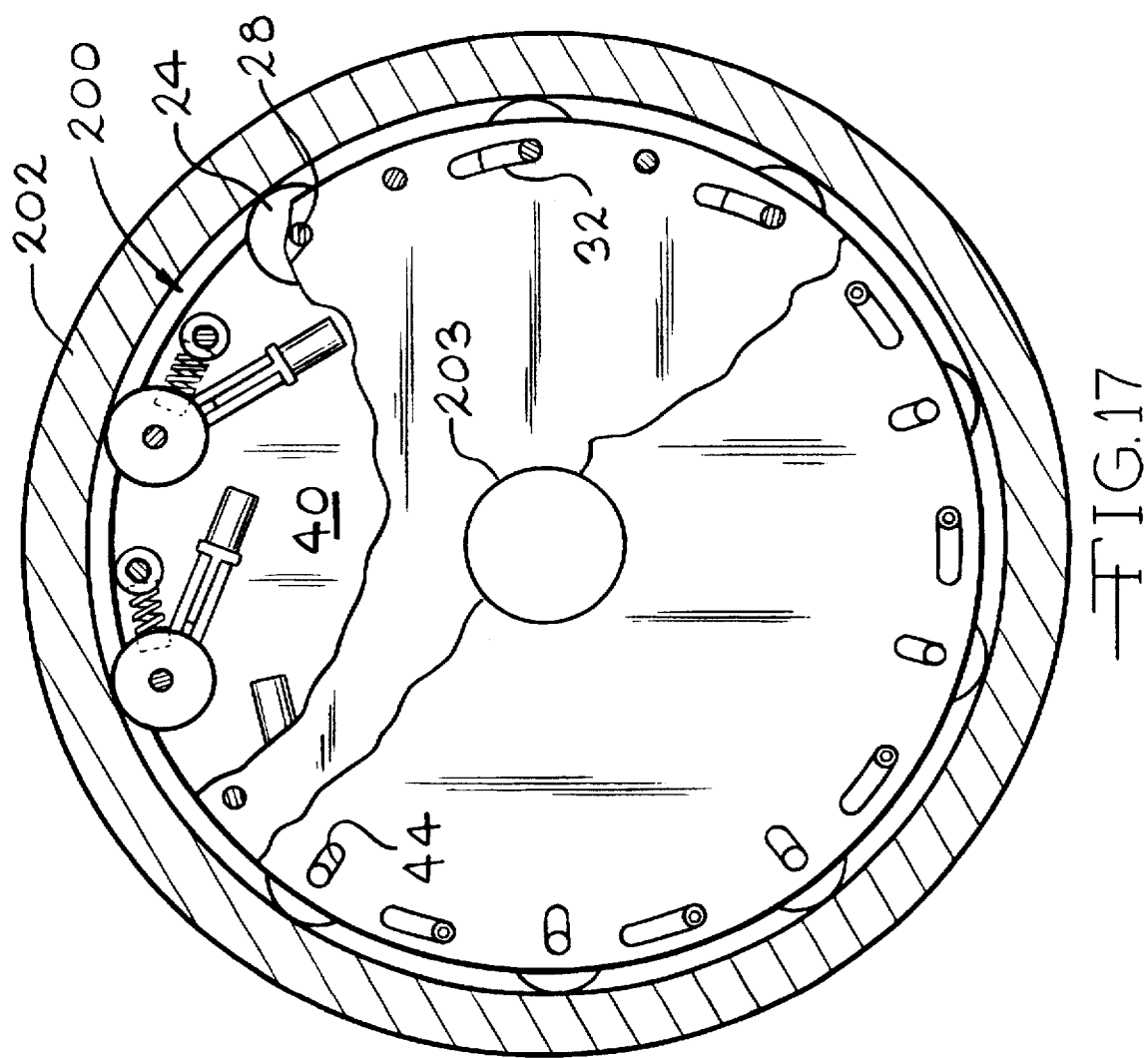

ZERO CLEARANCE AUXILIARY BEARING FOR PROVIDING ROTOR SHOCK TOLERANCE

The present invention relates generally to bearings. More particularly, the present invention relates to an auxiliary bearing for temporarily receiving rotor load during transient shocks or failure of an associated main bearing.

The need for high specific output power, low noise, durable, and maintenance free gas turbine driven generators has led to the development of lighter weight, higher speed rotors that require greater attention to rotor system vibrations and their control. Even though existing gas turbine generators are provided to operate below their bending critical speeds, the high operating speeds and resulting relatively high strain energy levels dictate that some form of damping be employed to control vibrations. Since advanced gas turbine engines typically use rolling element bearings, which have no inherent damping, it is common practice to install oil squeeze film dampers behind them to minimize rotor vibration amplitudes and reduce the dynamic loads transmitted to the bearings and supporting structure. While these bearings are considered to have a proven reliability, they are noisy and require a sophisticated and bulky support system.

Active magnetic bearings, wherein the rotor is suspended by magnetic fields, are being considered as an alternative. With active magnetic bearing technology maturing over the last decade, there has been interest in applying this technology to shipboard machinery as a means of achieving desired efficiency, space, and noise reduction goals. One of the major advantages active magnetic bearings have over conventional oil-film bearings and dampers is that they are inherently free of noise since no metal contact occurs and they have electronically adjustable dynamic properties for rotor vibration control and noise cancellation. In submarine systems where it is considered that every machine borne noise must be minimized or manipulated, active magnetic bearings are considered to be ideal for vibration isolation or elimination. Furthermore, active magnetic bearings consume less than one-tenth of power of the oil bearings, and they do not require any lubricant thereby eliminating bulky oil supply, scavenging, pumping, and cooling systems. For advanced naval vessels where energy efficiency, weight, and volume are considered to be imperative, active magnetic bearings are indeed considered to be a very attractive bearing alternative.

Although the active magnetic bearing has many advantages, there has been a difficulty or inability to provide an active magnetic bearing system which will survive and operate through transient external shock events which interfere with the magnetic suspension. Active magnetic bearings with regular laminated silicon steel cores have a projected load capacity of about 40 to 60 psi which is two orders of magnitude lower than the oil-film bearing capacity. Experience has shown that an active magnetic bearing-suspended rotor can support large static or slowly varying loads but can be easily overloaded with a relatively light impact load. The low dynamic stiffness of active magnetic bearings creates low frequency modes which result in large vibration displacements if excited. Consequently, for Naval and other applications where transient shock conditions are expected, active magnetic bearing-supported rotors require an auxiliary bearing system to assure continuous and reliable operation under transient conditions. Specifically, it is considered necessary that auxiliary bearings be able to survive impact or shock loads which may be tens of G's, and so that damage to the laminated steel cores is prevented. In addition, it is considered necessary that the auxiliary bearings be able to run for substantial periods of time when active magnetic bearings fail so that the ship or submarine or airplane may be brought back to a port or base for repair.

Conventional backup bearings are usually rolling element bearings with clearances between the rotor outer diameter and the bearing inner race inner diameter equal to about one-half of the magnetic bearing gap. Preloaded duplex ball bearings are used both as the radial backup bearing and a thrust backup bearing. For low speed applications, bushing type bearings with oil impregnated bronze have also been used as backup bearings. For high speed applications, such as gas turbine systems, these backup bearings do not have adequate life for sustained operation because of high DN values (bearing bore diameter in mm times speed in RPM) and poor lubrication. Besides, once an active magnetic bearing-supported rotor impacts the backup bearings, the friction of the contact surfaces may force the rotor to whirl backward in the large clearance, generating destructive forces. Some damping introduced behind the backup bearing has been experimentally demonstrated to be effective in controlling the backward whirl. However, the limited life of the conventional backup bearing is also caused by ball skidding and cage wear during the shock transients when the bearing experiences rapid acceleration. Galling and non-uniform wear also occurs at the shaft/bearing interface, resulting in a surface that exacerbates continued interface wear. U.S. Pat. Nos. 5,231,323; 5,272,403; and 5,345,127 disclose back-up bearings for magnetic bearings which suffer similar deficiencies. U.S. Pat. Nos. 2,674,445 and 3,247,601 may also be of interest as background for the present invention.

It is accordingly an object of the present invention to provide an auxiliary bearing for an active magnetic bearing which will provide continuous and reliable operation under transient shock conditions or during failure of the active magnetic bearing.

It is another object of the present invention to provide such an auxiliary bearing which has long life, i.e., can handle many transient shock events as well as have a long total time of use for supporting the rotor.

In order to provide such an auxiliary bearing in accordance with the present invention, the auxiliary bearing is provided to have a plurality of circumferentially spaced rollers mounted to a housing. At least some of the rollers are movable between first radial positions respectively affording clearance between the rollers and the rotor and second radial positions respectively for receiving by the rollers the rotor load. Means responsive to contact by the rotor with at least one of the rollers during rotation of the rotor are provided for effecting movement of all of the at least some rollers from the first radial positions toward the second radial positions respectively for closing the clearance and receiving by all of the rollers of the rotor load.

The above and other objects, features, and advantages of the present invention will be apparent in the following detailed description of the preferred embodiments thereof when read in conjunction with the accompanying drawings wherein the same reference numerals denote the same or similar parts throughout the several views.

BRIEF DESCRIPTION OF THE DRAWINGS

FIG. 13 is a partial, schematic, sectional view taken along a longitudinal center plane of the rotor illustrating another embodiment of the present invention, the other half thereof in the plane being the same as that shown.

FIG. 17 is a schematic view, with parts broken away, taken along a radial plane of a rotor, illustrating another embodiment of the present invention.

FIG. 18 is a schematic view of the embodiment of FIG. 17, taken along an axial plane of the rotor.

DETAILED DESCRIPTION OF THE PREFERRED EMBODIMENT

Referring to FIGS. 1 to 6, there is shown at 20 a rotor which is rotatably mounted within main bearings (not shown). The main bearings may, for example, be active magnetic bearings, and the rotor may, for example, be for a ship's gas turbine driven generator. However, other applications of the present invention include, but are not limited to, use with active magnetic bearings for pipeline compressors in the petrochemical industry and use with aircraft gas turbine engines and flight-worthy auxiliary power units, since they are subjected to hard maneuvers and landing shocks. Such a rotor may be subject to transient shocks which may require the load to be temporarily received by auxiliary bearings until conditions have stabilized. In addition, it may be necessary to temporarily receive the load until port can be reached so that failed main bearings may be repaired.

Figure 1:
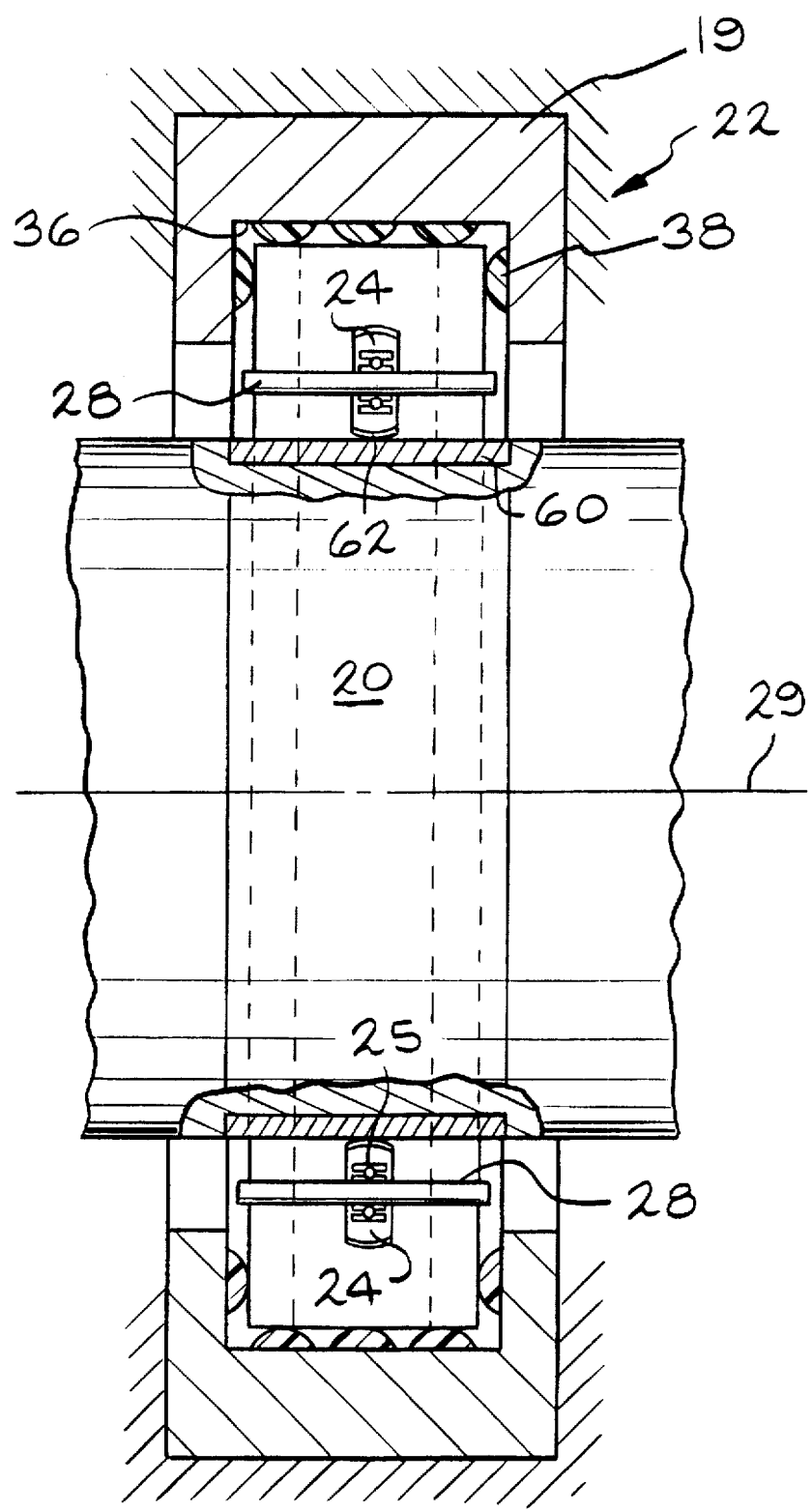
FIG. 1 is a schematic or lay-out view, taken in an axial plane of a rotor, of a portion of the rotor and an auxiliary bearing therefor which embodies the present invention, with rollers therefor illustrated engaging the rotor.
Figure 2:
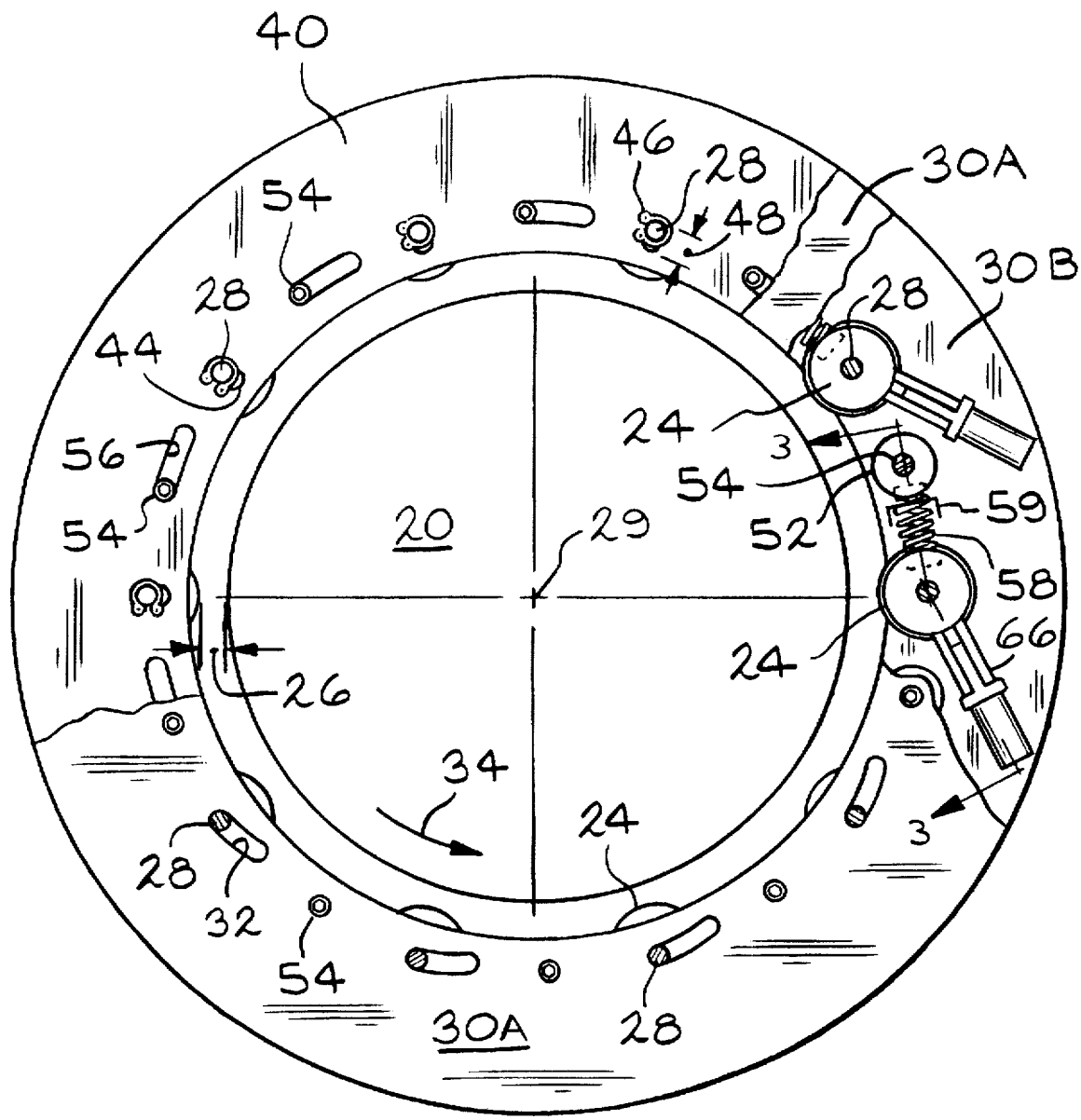
FIG. 2 is a side schematic or lay-out view thereof taken in a radial plane of the rotor with portions of the auxiliary bearing removed and with a clearance illustrated between the rollers and rotor.

In order to achieve these objects reliably, in accordance with the present invention, an auxiliary bearing, illustrated generally at 22, is provided which has a plurality of rollers 24 mounted for positioning so that they are spaced from the rotor 20 to define a clearance, illustrated at 26, during normal operation, as illustrated in FIG. 2, and for movement to close the clearance or gap 26, as illustrated in FIG. 1, during transient shock events or when it is otherwise necessary to receive the rotor load. Thus, when this zero clearance auxiliary bearing 22 is engaged by the rotor 20, the initial shaft-to-auxiliary bearing clearance 26 will automatically be reduced to zero, as seen in FIG. 1, until which time the shock event subsides and the main bearings are able to again receive the rotor load as discussed hereinafter. Such a zero clearance auxiliary bearing is provided to eliminate the possibility of violent backward whirl prevalent in fixed clearance auxiliary bearings and to achieve a low DN value and long service life. Such an auxiliary bearing is also provided to not only protect the active magnetic main bearings but also to help to rapidly damp out the rotor shock response.

As seen in FIG. 2, there may be perhaps about 10 rollers 24 rotatably mounted on rolling element bearings, illustrated at 25, which are in turn mounted on stub or drive support shafts 28. The rolling element bearings 25 suitably are sealed high precision grease packed units such as, for example, SKF no. 618002Z bearings. Since the bearing bore diameter is always less than the roller diameter, the bearing DN values will always be less than those of a conventional rolling element auxiliary bearing or the other conventional auxiliary bearings described hereinbefore to accordingly result in increased life.

The rollers are equally spaced circumferentially around the periphery of the rotor 20 to provide a concentric clearance circle, having the clearance 26, between the rotor 20 and the rollers 24. The number of rollers is selected to meet the system size, speed, and both steady state and transient load requirements, and can be selected using principles commonly known to those of ordinary skill in the art to which this invention pertains.

Figure 3:
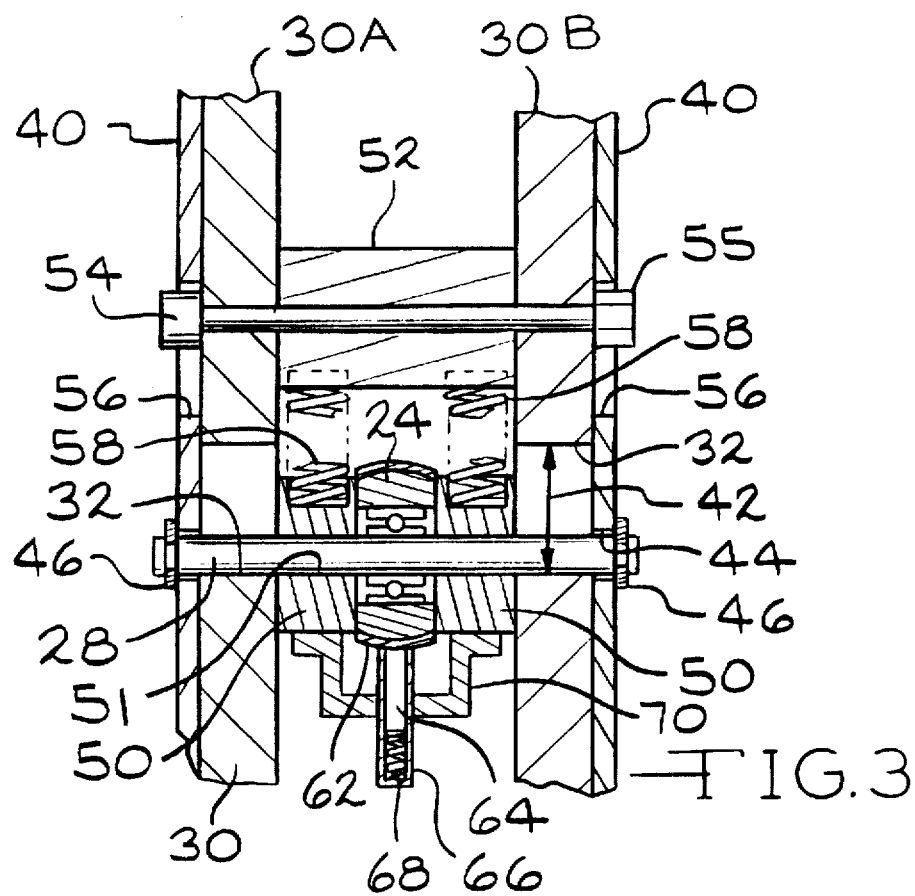
FIG. 3 is a sectional view thereof taken along lines 3—3 of FIG. 2.
Figure 4:
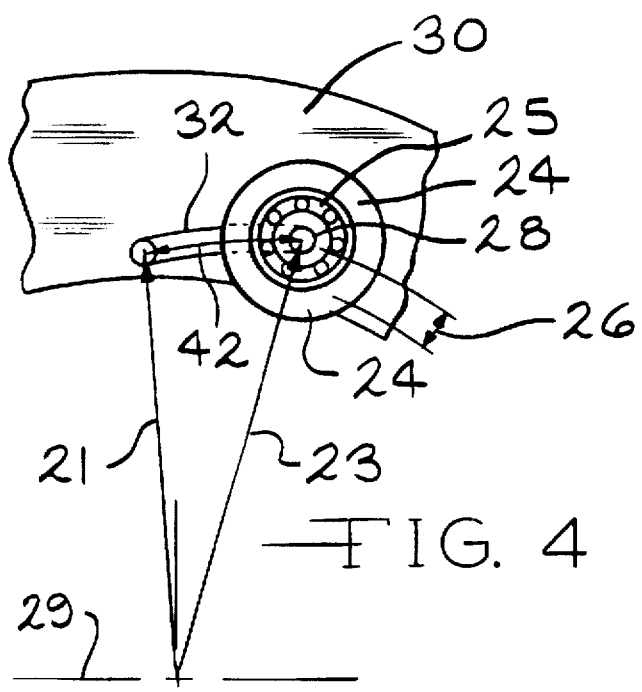
FIG. 4 is an enlarged detail view of a roller and drive slot therefor.
Figure 6:
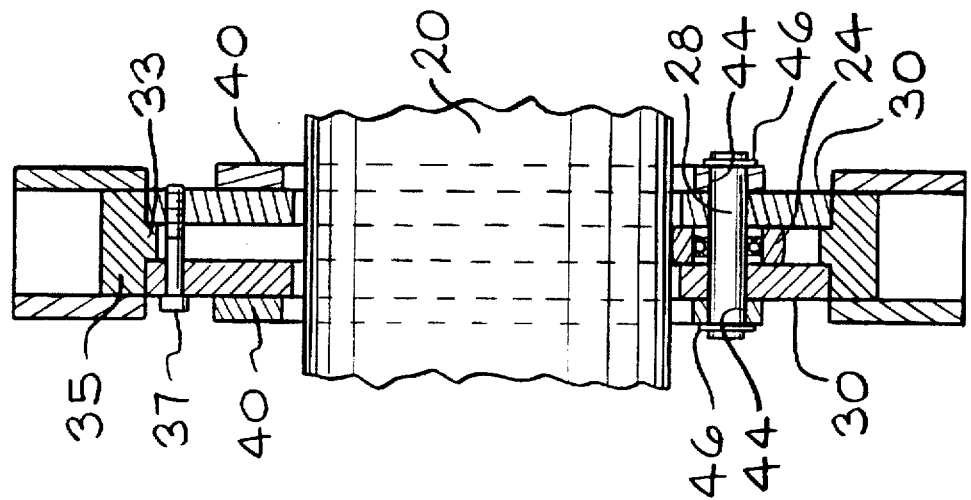
FIG. 6 is a section view thereof taken along lines 6—6 of FIG. 5.
Figure 5:
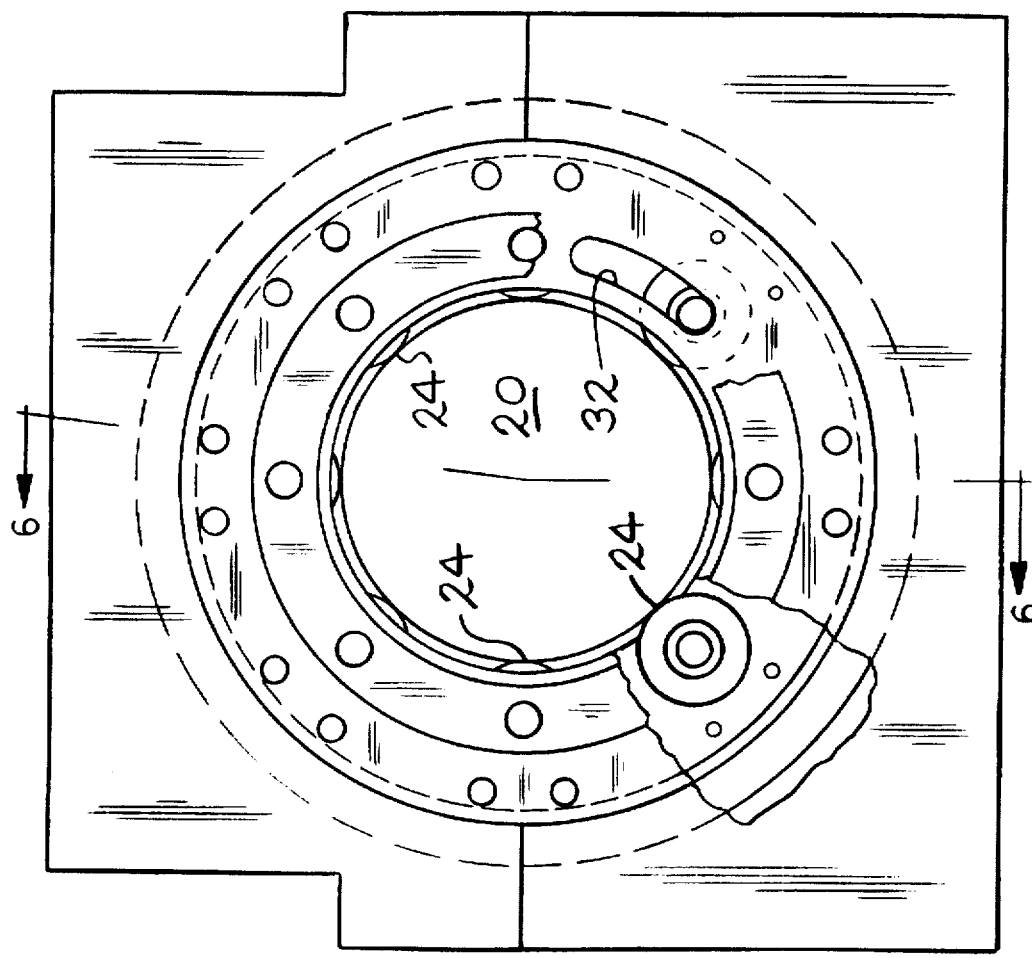
FIG. 5 is a side view, with portions removed, of an auxiliary bearing constructed generally in accordance with the schematic of FIGS. 1, 2, and 3, illustrating the rollers engaging the rotor.

As seen best in FIG. 3, each of the stub shafts 28 is carried by a pair of fixed or stationary spaced support plates 30 and received in support plate slots 32 which extend a short distance circumferentially in the direction, illustrated at 34 in FIG. 2, of rotor rotation for sliding movement within the slots 32. For ease of illustration, the pair of support plates 30 are provided with reference numerals 30A and 30B respectively in FIGS. 2 and 3 as well as in FIGS. 8 and 9. FIG. 3 illustrates the support plates 30 held in fixed position relative to each other by member 52, which acts as a spacer, and bolt 54 and nut 55. Suitable openings 56 are provided in the drive rings 40 for accommodating the head of the bolt 54 and the nut 55. FIG. 1 illustrates the support plate assembly received in a recess 36 of a housing or mounting ring 19 with a suitable visco-elastic material or elastomer, providing a compliant structural stiffness and damping structure 38, interposed in the recess 36 between the assembly of support plates 30 and the mounting ring 19 to reduce bearing and roller forces during the transient impact and subsequent operation of the auxiliary bearing. The stiffness and damping of the support plate mounting system is provided to limit radial deflection and protect the active magnetic bearing laminations while isolating most of the external loads and controlling rotor system dynamics during shock and post-shock operation, using principles commonly known to those of ordinary skill in the art to which this invention pertains. FIG. 6 alternatively shows the plates 30 suitably held together by means of a spacer portion 33 of housing block 35 and fasteners 37. Referring back to FIG. 1, the support plates 30 are mounted within a recess 36 in the housing or mounting ring 19 and preloaded where clamped in place. An anti-rotation pin (not shown) is inserted radially so as to prevent rotation thereof yet allow some freedom of plate movement to accommodate vibrational motion. The slots 32, which may be slanted or curved, are oriented so that the distance of each slot, over its length, from the rotor axis 29 decreases, in the direction of rotor rotation, from distance 23 at one end of the slot to distance 21 at the other end thereof, as seen in FIG. 4. Thus, the slots 32 extend radially inwardly (toward the rotor), as best seen in FIG. 4, a distance (difference between distance 23 and distance 21) equal substantially to the clearance 26 so that the movement of the rollers 24 circumferentially (to the left in FIG. 4) also effects their movement radially inwardly to close the clearance 26 and receive the rotor load. Thus, when, during a transient shock, the rotor 20 contacts a roller 24, it will cause the roller shaft 28 to move along its slot 32, bringing the roller 24 radially inwardly to receive the rotor load.

The rotor load must of course be shared with others of the rollers. In order to effect movement of others of the rollers radially inwardly to share the rotor load when one is being moved radially inwardly, a pair of plates or drive rings 40 are mounted to the outer sides of the support plates 30 respectively so that they can slidably move circumferentially over a distance equal to the lengths, illustrated at 42, of the slots 32. The end portions of the stub shafts 28 are received in slots 44 in the drive rings 40 respectively, and the drive rings 40 are held adjacent the sides of the support plates 30 respectively by retainer rings 46 or other suitable means so that the drive rings 40 are slidable relatively to the support plates 30. The drive ring slots 44 extend radially over a distance, illustrated at 48, which is substantially equal to the clearance 26. The contact surfaces between the support plates 30 and drive rings 40 are suitably tribological wear resistance surfaces which are lubricated with a dry lubricant to reduce the friction for promoting sliding movement therebetween.

When the rotating rotor 20 contacts any one of the rollers causing it to move circumferentially and radially inwardly along its respective support plate slot 32, the attachment of its stub shaft 28 to the drive rings 40 effects circumferential movement thereof and accordingly forces all of the stub shafts 28 to move together circumferentially along their support plate slots 32 respectively so that all of the rollers 24 are moved in unison radially inwardly to close in on the rotor uniformly, thereby providing rotor support. The radial lengths 48 of the drive ring slots 44 are selected to allow such radially inward and outward movement. Furthermore, it is preferable that the lengths 26 and 48 radially of slots 32 and 44 be somewhat greater than needed when the auxiliary bearing is newly installed to allow the rollers 24 to close a greater clearance which may result due to wear of the rotor 20. Thus, all of the rollers 24 are carried radially inwardly to close the clearance 26 and receive and share the rotor load. The rollers continue to receive the rotor load as long as the transient shock condition persists (or as long as the main bearings are inoperative) and resulting forces are applied by the rotor to the rollers in the direction 34 so that the rollers are kept in radially inner positions.

When the transient shock condition has stabilized and the main bearings are operative to assume the rotor load, it is desirable that the rollers automatically return in unison to their radially outer positions. In order to effect such return, the rollers are spring-biased or otherwise suitably biased to the radially outer positions. Thus, a pair of sliding bearing mounts or movable spring supports 50 are provided between each roller and the inner surfaces respectively of the support plates 30 and the sliding surfaces suitably lubricated to reduce friction. The stub shafts 28 are received in apertures 51 in the movable spring supports 50 so that the movable spring supports 50 are carried by the stub shafts 28 for movement therewith. For each pair of movable spring supports 50, a corresponding spacer member 52 serves as a stationary spring support 52. Suitable compression springs 58 are mounted in recesses in the movable spring supports 50 and in recesses in the corresponding stationary spring support 52 to bias the stub shafts 28 to move to the radially outer positions when less than a predetermined amount of force is being applied in the direction 34 by the rotating rotor 20. A suitable damping element, illustrated at 59, may be applied for damping the movement of the stub shafts along the slots 32. The strength of the springs 58 may be selected using principles commonly known to those of ordinary skill in the art to which this invention pertains. Thus, when a transient shock event has ceased and conditions stabilized with the main bearings again receiving the rotor load, there should not be sufficient forces exerted on the rollers by the rotating rotor to prevent the springs 58 from restoring the stub shafts and their accompanying rollers to their radially outer or unloaded positions providing the clearance 26. The restoring springs 58 are thus sized to desirably provide the needed force to overcome the roller-to-rotor and drive support shaft-to-support plate slot traction and friction forces when the rotor is supported by the magnetic bearings.

The rotor 20 is suitably provided with an inlaid wear resistant sleeve, illustrated at 60, composed of, for example, 52100 bearing steel, for providing a contact surface for the rollers 24. When the auxiliary bearing is provided to also accommodate axial or thrust loads, the width of the sleeve 60 is desirably increased therefor. The roller profile is selected to minimize Hertzian contact stresses on both the roller and rotor sleeve, in accordance with principles commonly known to those of ordinary skill in the art to which this invention pertains. The rollers 24 may be composed of steel or other suitable material and are suitably provided with wear resistance crowned sleeves, illustrated at 62, composed of, for example, 440C or 52100 bearing steel for engaging the rotor sleeve 60 so as to reduce wear between the rollers and rotor. The rotor sleeve 60 and rollers 24 may advantageously be replaced for low cost maintenance.

A suitable dry compacted powder lubricant or lubricating wax, illustrated at 64, is desirably applied to each of the rotating rollers 24 to promote traction and reduce wear. It is applied by means of a dry lubricant container 66 with a preloaded spring 68 which causes the stick of lubricant 64 to be pressed against the roller outer periphery. The lubricant container 66 is mounted in position with its end adjacent the respective roller by means of a bracket 70 which is suitably attached to movable spring supports 50 or by other suitable means. The lubricant is desirably self-contained and replaceable. For high temperature application, a solid lubricant such as, for example, $MoS_2$ is considered desirable, while for a room temperature application, a lubricating wax such as, for example, carnauba wax is considered desirable. Thus, when the roller comes into contact with the rotor and begins to rotate, lubricant is transferred to the surface of the roller, drawing the lubricant into the contact region. The lubricant is provided to increase the traction coefficient between the roller and rotor to in turn reduce the skidding potential and the coefficient of restitution. While the use of a solid lubricant will minimize wear and its impact on the rollerto-rotor clearance, the drive ring and support plate slots are nevertheless desirably machined with sufficient length to accommodate roller/rotor wear, should it occur.

During the post-shock phase, the rotor may undergo a period of support by both the auxiliary and magnetic bearings. As the magnetic bearing regains control of the rotor, possible interactions between the auxiliary and magnetic bearings are likely to occur. For example, the magnetic bearing magnetic center and the auxiliary bearing geometric center will likely not be coincident. In order to prevent undesired interactive loading between the auxiliary bearing rollers and the magnetic bearing during recovery periods, a suitable approach is considered to be to temporarily reduce the integral gain of the PID controller for the magnetic bearing during the shock and post shock event and move the magnetic bearing reference center slightly to unload the auxiliary bearing rollers so that they automatically retract to thereby result in full magnetic bearing control.

It should be understood that various other embodiments, as described hereinafter, of the present invention may be made, and such other embodiments are meant to come within the scope of the present invention, which is of course not limited to those embodiments described herein. For example, other means may be provided, as described hereinafter, for restoring the unloaded positions of the rollers. For another example, the auxiliary bearing may be internal of a tubular rotor, as described hereinafter with reference to FIGS. 17 and 18. For still another example, the auxiliary bearing may be provided for thrust as well as radial loads in a compact package. For yet another example, some of the rollers may be fixedly mounted so that they are not movable between radially inner and outer positions.

Figure 7:
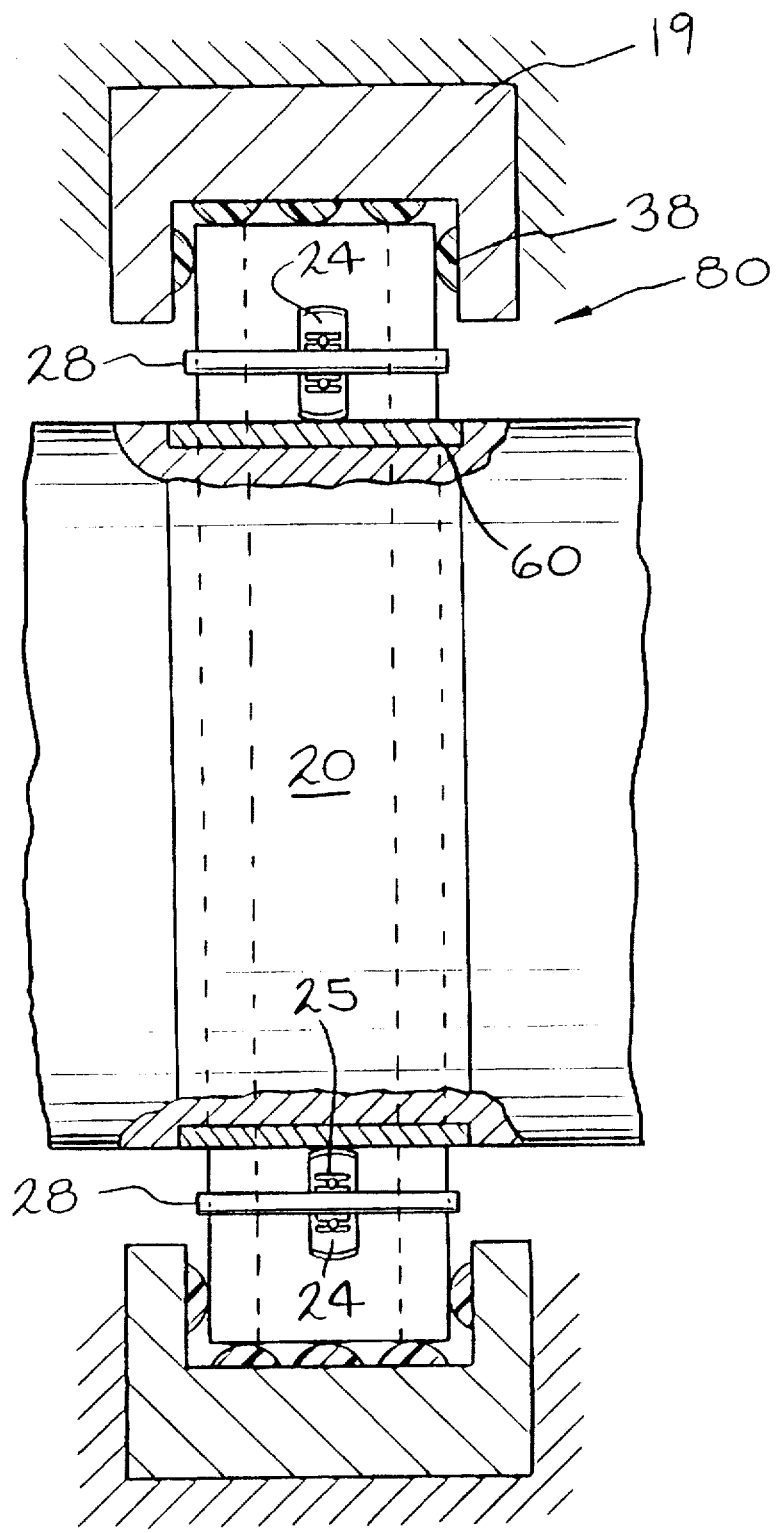
FIGS. 7, 8, and 9 are views similar to those of FIGS. 1, 2, and 3 respectively of an alternative embodiment of the present invention.
Figure 9:
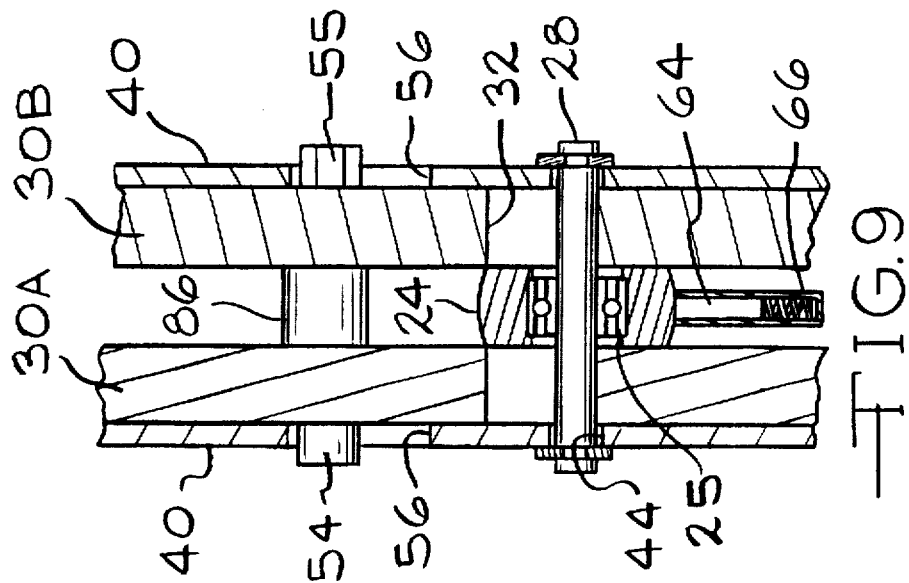
Figure 8:
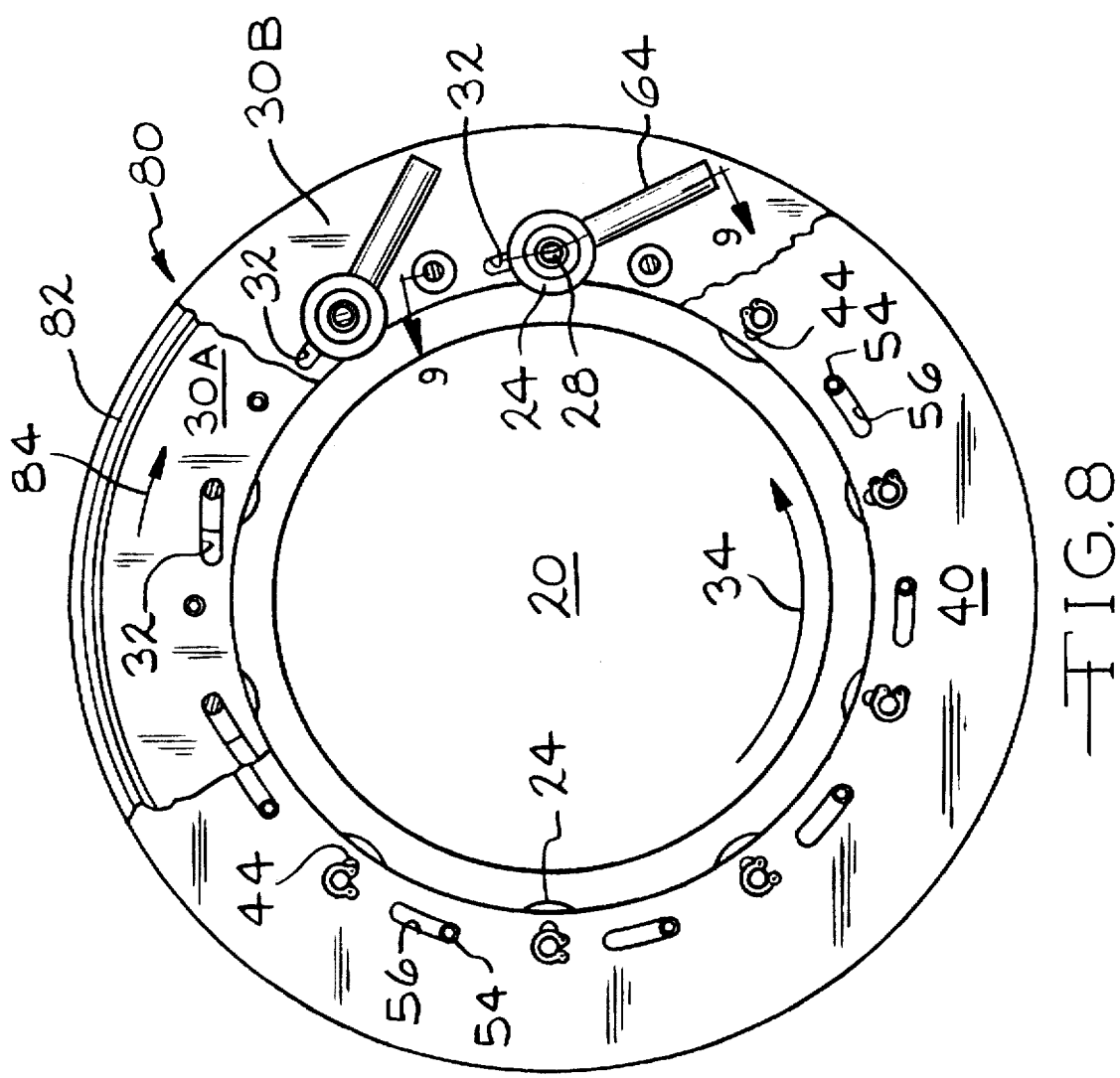

Referring to FIGS. 7, 8, and 9, there is illustrated generally at 80 an auxiliary bearing in accordance with an alternative embodiment of the present invention. The auxiliary bearing 80 includes a plurality of rollers 24 rotatably mounted on rolling element bearings 25 which are in turn mounted on stub shafts 28, and the stub shafts are received in slots 32 and 44 for circumferential and radial movement between unloaded positions and loaded positions wherein the clearance 26 is closed, all similarly as described with reference to FIGS. 1 to 6.

As seen in FIG. 9, this embodiment 80 of the auxiliary bearing does not contain the springs 58. Instead, in order to bias the stub shafts 28 and accordingly the rollers 24 to the unloaded positions providing the clearance 26, a suitable pair of torsion springs, one of which is illustrated at 82, are provided with one end of each spring 82 attached to the respective drive ring 40 and the other end attached to a suitable ground member for providing spring biasing force in the direction illustrated at 84, which is opposite the direction 34 of force applied by the rotor 20 to the rollers during transient shock conditions. Instead of spring support 52, a spacer member 86 is provided between support plates 30, and the support plates 30 attached together and held in a rigid fixed relationship by means of bolt 54 and nut 55 or other suitable fastening means.

To suitably design either the springs 58 or the springs 82, one needs to know the traction forces of the contact surfaces between the rollers and the rotor. It is considered essential to maintain the traction forces in a predictable range. It may also be necessary to provide for adjustable stiffness of the springs to accommodate variation of the traction forces. If these forces are too large, the drive rings and rollers will not wind to the zero clearance (rotor support) angular position in the spiral grooves 32. Furthermore, at the wound angular positions (rotor support position), the rollers may not be released to return to their unloaded positions due to relatively weak springs and the vibration orbit of the rotor in the magnetic bearing.

Figure 10:
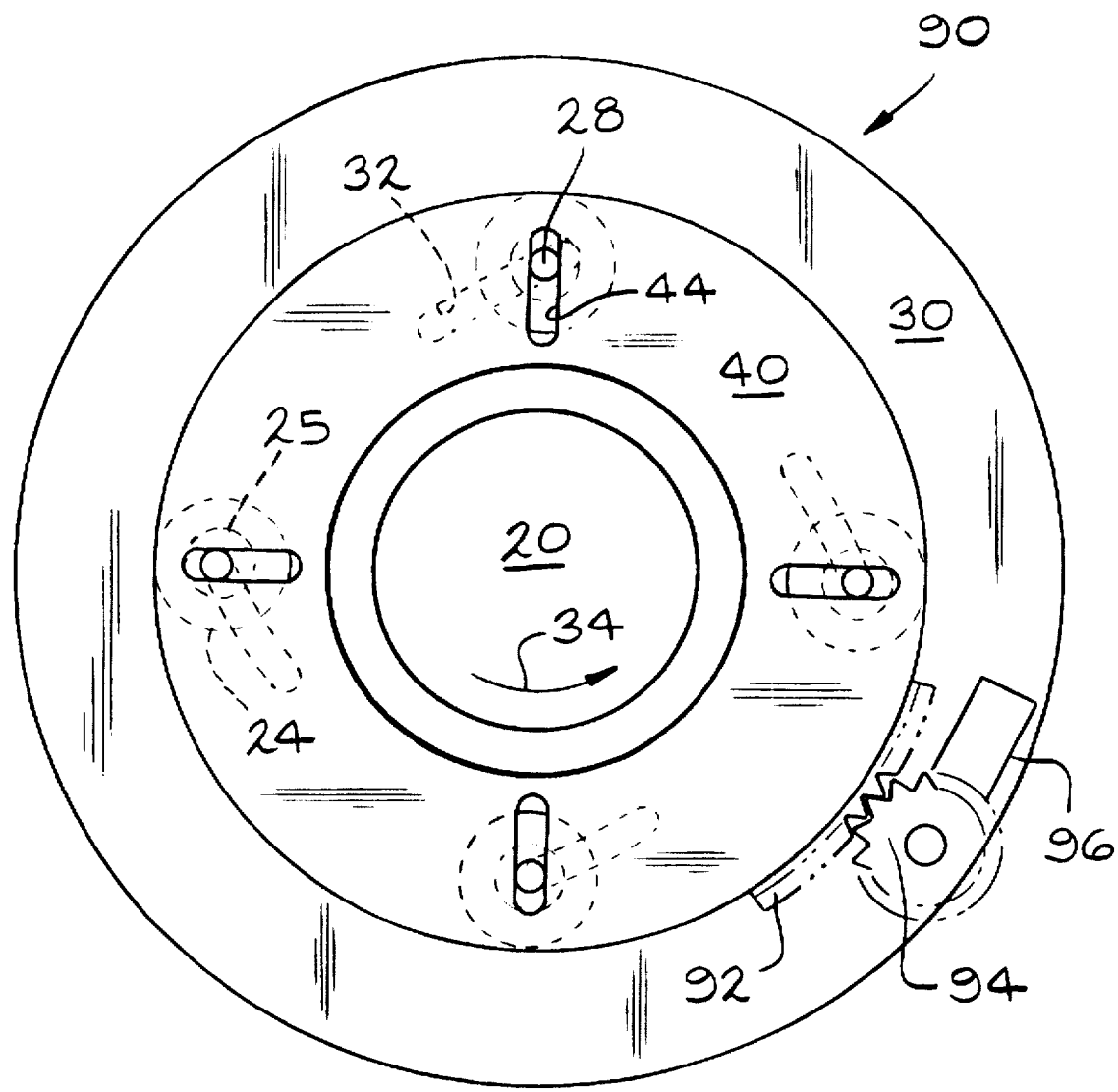
FIG. 10 is a schematic view taken in a radial plane of the rotor illustrating another embodiment of the present invention.

Referring to FIG. 10, there is illustrated generally at 90 an auxiliary bearing which may suitably be mounted on an elastomer mount and which incudes a plurality of rollers 24 rotatably mounted on rolling element bearings 25 which are in turn mounted on stub shafts 28, and the stub shafts 28 are received in slots 32 and 44 for circumferential and radial movement between unloaded positions and loaded positions wherein the clearance 26 is closed, all similarly as described with reference to FIGS. 1 to 9. This embodiment 90 of the auxiliary bearing does not contain springs 58 or 82. Instead, in order to assure positive winding and unwinding of the drive ring and rollers assembly, active control means, as described hereinafter, is provided.

One type of active control means is illustrated in FIG. 10. In accordance with this active control means, a circumferentially extending toothed rack 92 is suitably mounted to an edge portion of each of the movable drive rings 40. A toothed wheel 94 powered by a suitable stepping motor, illustrated at 96, is mounted on the respective stationary support plate 30 for rotating the rack 92. The drive rings are mounted so that there is no relative radial displacement between the drive rings and the support plates whereby the mesh gear will not separate during operation. The stepping motor 96 is desirably controlled, such as by programmed control, to apply the desired force to return the drive rings 40 and rollers to the unloaded position with clearance 26 when the magnetic bearings take over the rotor load.

Other means of control which are envisioned for returning to the unloaded position include the use of solenoids or leveling mechanisms. In order to insure against loss of power, the mechanism may be spring-loaded at release position when the power is on so that the spring will wind and tighten the rollers onto the rotor with power off with the result of the mechanism being fail-safe. Sensor signals for initiating winding and unwinding may be, for example, magnetic bearing displacement probes or the existing current and back-EMF signals in the magnetic bearing coils. Strain gages may desirably be provided on the support plates to detect roller loads. The signals may be processed and synthesized by a fuzzy logic controller, if necessary, to make reliable control decisions.

A suitable type of rolling element bearing 25 for use with rollers 24 will depend on the system requirements and application. For example, under high radial loads, a cylindrical roller bearing is preferred. Under high thrust loads, angular contact rolling element bearings, as discussed hereinafter with reference to FIG. 13, are preferred. For general use where loads are not too great, a deep groove ball bearing, providing both radial and thrust capability, may be considered desirable. In some circumstances, it may be considered desirable to not use the wear resistant rollers at all and to instead utilize the outer race of the rolling element bearing.

Figure 12:
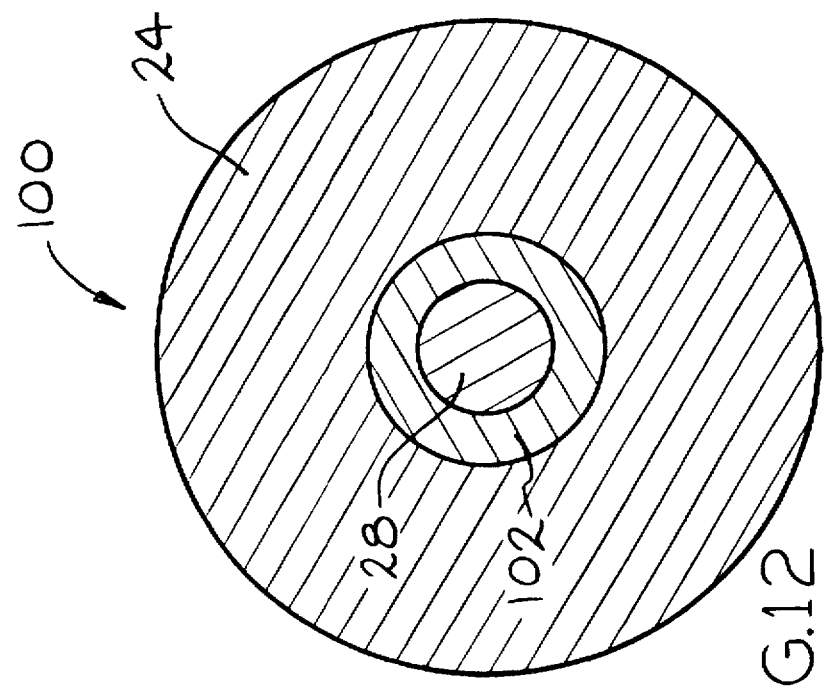
FIG. 12 is a schematic sectional view thereof taken along lines 12—12 of FIG. 11.
Figure 11:
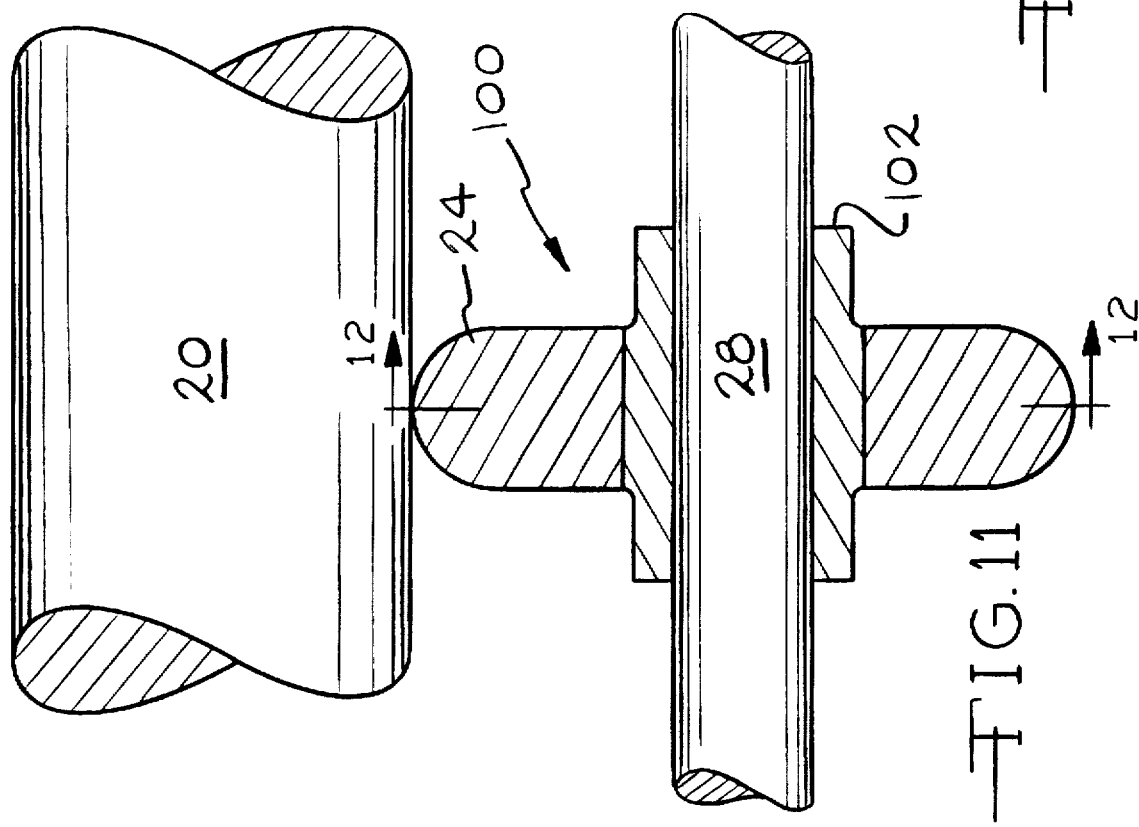
FIG. 11 is a schematic sectional view, taken in a longitudinal center plane of the rotor, illustrating another embodiment of the present invention.

Referring to FIGS. 11 and 12, there is illustrated generally at 100 an alternative stub shaft/roller assembly for the auxiliary bearing of the present invention. Instead of a rolling element bearing 25, the roller 24 is rotatably mounted to the stub shaft 28 by means of a cylindrical self-lubricated sleeve 102, which may be solid lubricated or of a hydrodynamic (fluid film) oil-lubricated type or otherwise lubricated with grease, oil, or dry (solid) lubricant.

Referring to FIG. 13, there is illustrated generally at 110 an alternative bearing/roller assembly for handling large thrust and radial loads. In this embodiment, a pair of angular contact ball bearings 112 having ball elements 113 are provided side by side with the movement axially of their inner races 114 limited by axially spaced cylindrical stops 116 which are suitably attached to the stub shaft 28 and their outer races 118 fixed to housing 120. Thus, the inner races 114 are contained within and are able to float or move axially relative to each other within the confines between the axially spaced cylindrical stops 116. The outer races 118 are contained within a cylindrical recess 122 in the housing 120 and abut the shoulders 124 respectively defined by the recess 122 and are suitably fixedly attached thereto. Thus, the inner races 114 are able to move axially relative to the respective outer races 118, and such movement is allowed by the shape of the ball element-engaging race surfaces 125 and 126 of the inner and outer races respectively of the angular contact ball bearings 112. Thus, the surfaces 125 and 126 each have generally cylindrical portions 128 along which the ball elements 113 may be received and generally radially extending portions 130 which serve to contain the ball elements 113 between the radially extending portions 130 on the inner and outer races. A pair of rotor-engaging rollers 132 are mounted on the radially outer surface 134 of housing 120 between a cylindrical stop member 136 suitably attached to the housing 118 and another stop member 138 which may be threadedly removably attached to the housing 120 so that the rollers may float or move axially within the confines between stops 136 and 138.

The rotor 20 is provided with a wear-resistant sleeve 140 for providing surface contact for the rollers 132. The sleeve 140 has a circumferentially-extending recess 142 therein for receiving the rollers 132 so that axial movement of the rotor 20 is restrained when the edges of the recess 142 bear against the respective rollers 132, i.e., the rollers 132 thus also act as thrust bearings. The corners of the recess 142 are suitably rounded, as illustrated at 144, and the complementary corners of the rollers 132 are similarly rounded, as illustrated at 146, to accommodate such thrust impact.

Preloaded compression springs 148 (only one shown) are provided circumferentially around the stub shaft 28 between the inner races 114 to pre-load the bearings against thrust impact with the rollers under which the springs 148 will allow dampened movement of the respective bearing axially to absorb the thrust shock as well as to manage misaligned shock and transient load conditions. Preloaded compression springs 150 are also provided circumferentially around the surface 134 between the rollers 132 to also manage axial or thrust loads as well as misaligned shock and transient load conditions. Like the rollers 24, the rollers 132 desirably have wear resistance crowned sleeves.

Instead of the ball bearings 112, the roller assembly 110 of FIG. 13 may utilize a self-lubricated sleeve bearing such as illustrated at 102 in FIGS. 11 and 12.

The roller/bearing assembly 110 utilizing a plurality of bearings and rollers is provided for handling thrust (axial) as well as radial loads while having the advantages of being able to carry a large load in a small diametral space, achieving reduced bearing diameter (such as, for example, provided by ball bearings) which permits higher operating speeds to be reached while maintaining low DN values, handling shaft misalignment, providing the desired dampening of roller movement in response to thrust forces by adjusting the stiffness of springs 150, and providing the desired bearing stiffness by adjusting the stiffness of the springs 148.

Figure 14:
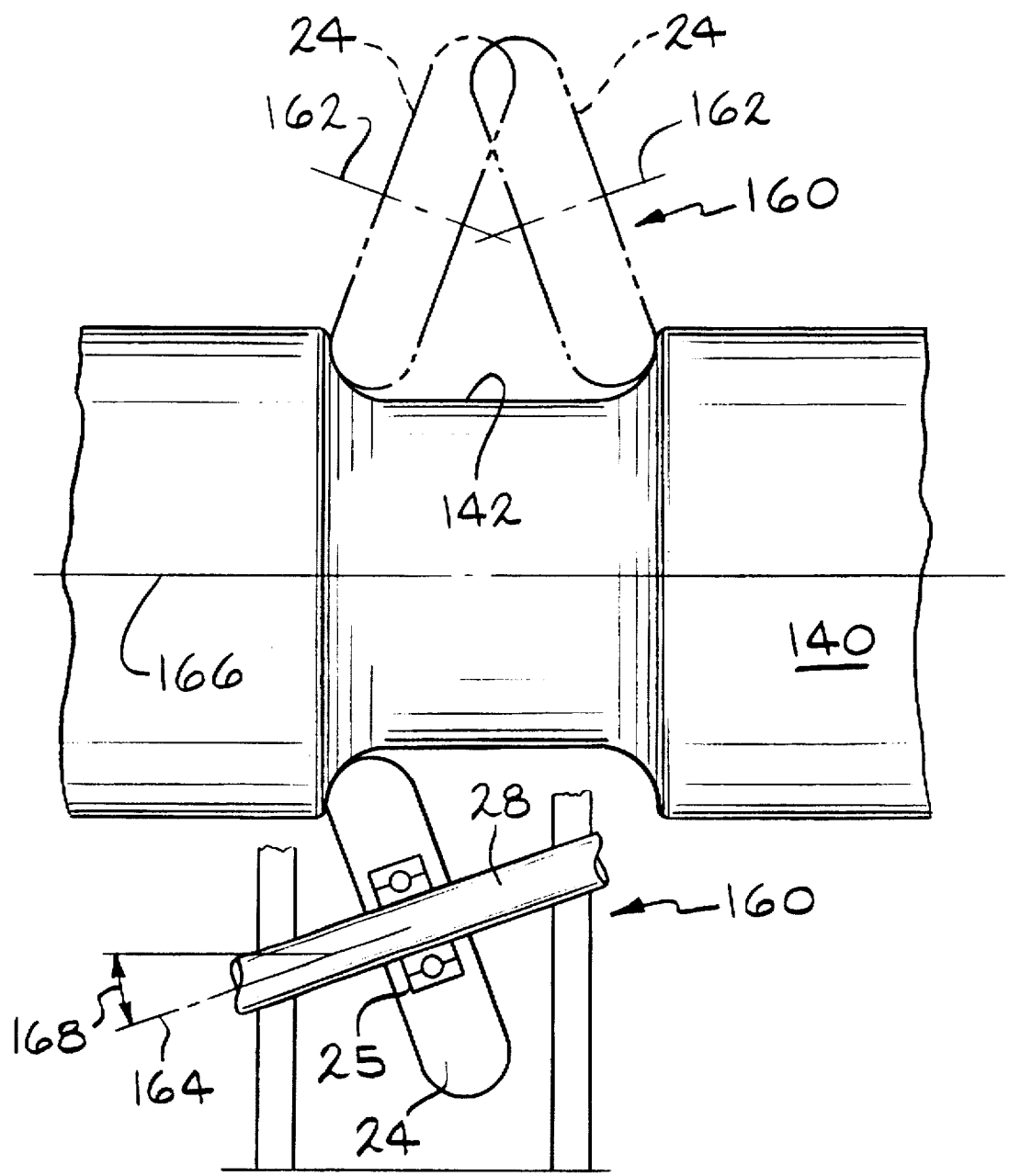
FIG. 14 is a schematic view taken in a longitudinal center plane of the rotor illustrating another embodiment of the present invention.

Referring to FIG. 14, there is illustrated generally at 160 an alternative arrangement of rollers 24 for an auxiliary bearing for handling thrust as well as radial loads in accordance with the present invention. As illustrated therein, the rollers' axes 162 are skewed to the left and right sides in an alternating manner in order to enhance load and misalignment handling capability. Thus, the stub shafts 28 are suitably mounted so that their axes 164 are un-parallel (skewed) relative to the main shaft axis 166. The skewed angle, illustrated at 168, may be up to about 45 degrees (about 1 to 45 degrees). The peripheries of the rollers are suitably rounded for suitable engagement with the sides of the recess 142, and the sides of the recess 142 are also rounded, similarly as described for FIG. 13. As seen in FIG. 14, the rollers 24 are desirably arranged to form a V-shaped support system with half of the rollers 24 contacting the rotor 20 at a different axial location than that at which the other half of the rollers contact the rotor, to thereby reduce wear on the rotor.

Figure 15:
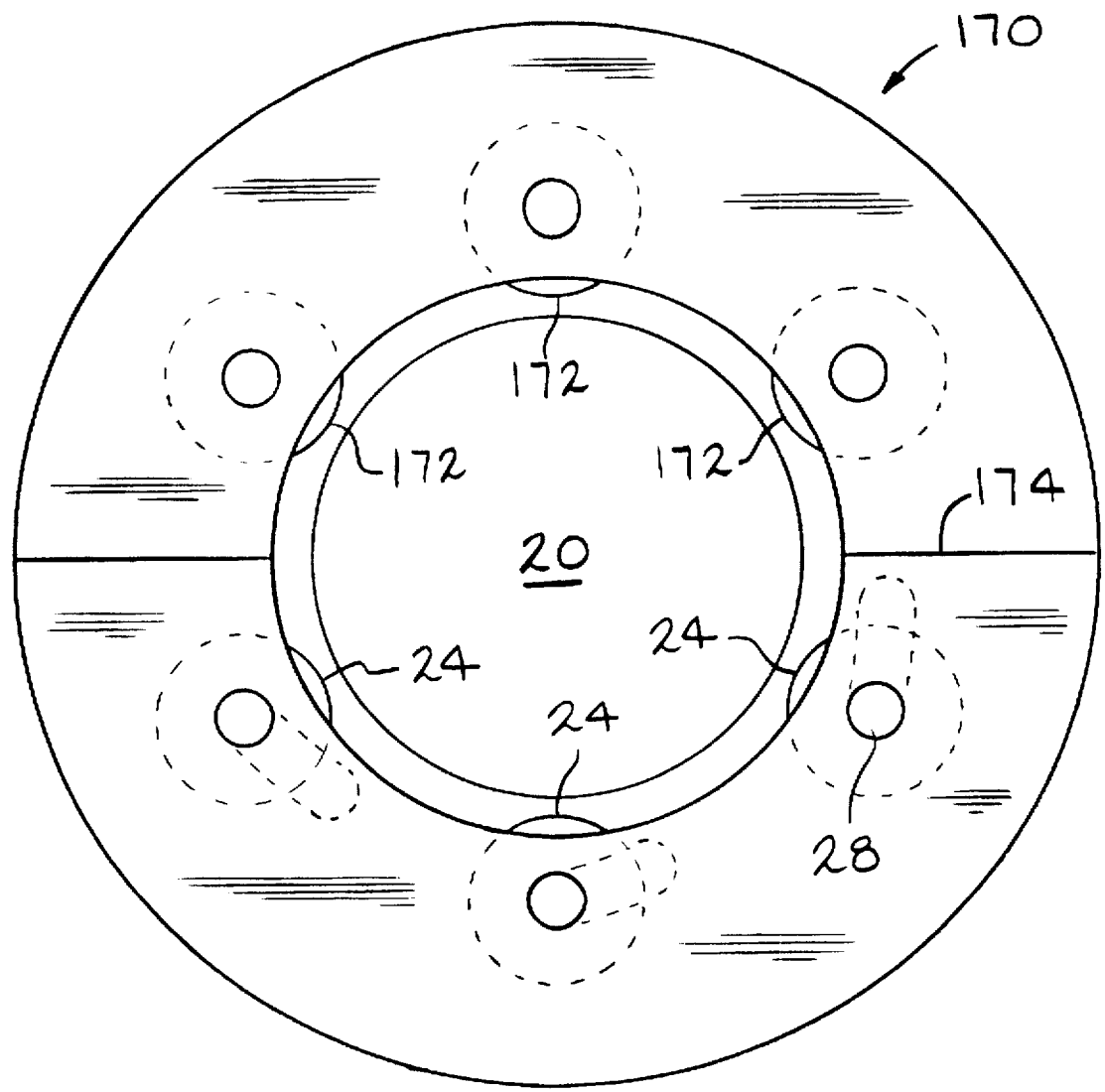
FIG. 15 is a schematic view taken in a radial plane of the rotor illustrating another embodiment of the present invention.

As previously discussed, the present invention is meant to include embodiments where not all of the rollers are radially moveable to close the clearance. Referring to FIG. 15, there is illustrated generally at 170 one embodiment of such an auxiliary bearing containing 6 circumferentially-spaced rollers wherein the lower 3 rollers 24 are of the radially-movable type as described hereinbefore, and wherein the upper 3 rollers, illustrated at 172, are fixed in position, i.e., their stub shafts are not movable either radially or circumferentially. In this arrangement, when the magnetic bearing levitates the rotor 20 (i.e., unloads the lower half of the rollers), the clearance 26 opens and the magnetic bearing takes over the control of the rotor 20. Thus, this arrangement is desirable to control the on and off condition of the auxiliary bearing automatically. Since this arrangement does not require drive rings to extend circumferentially all the way around the rotor, the auxiliary bearing 170 may desirably be split horizontally, as illustrated at 174, so that it can be assembled over the rotor 20 for convenience in mounting and assembly.

Figure 16:
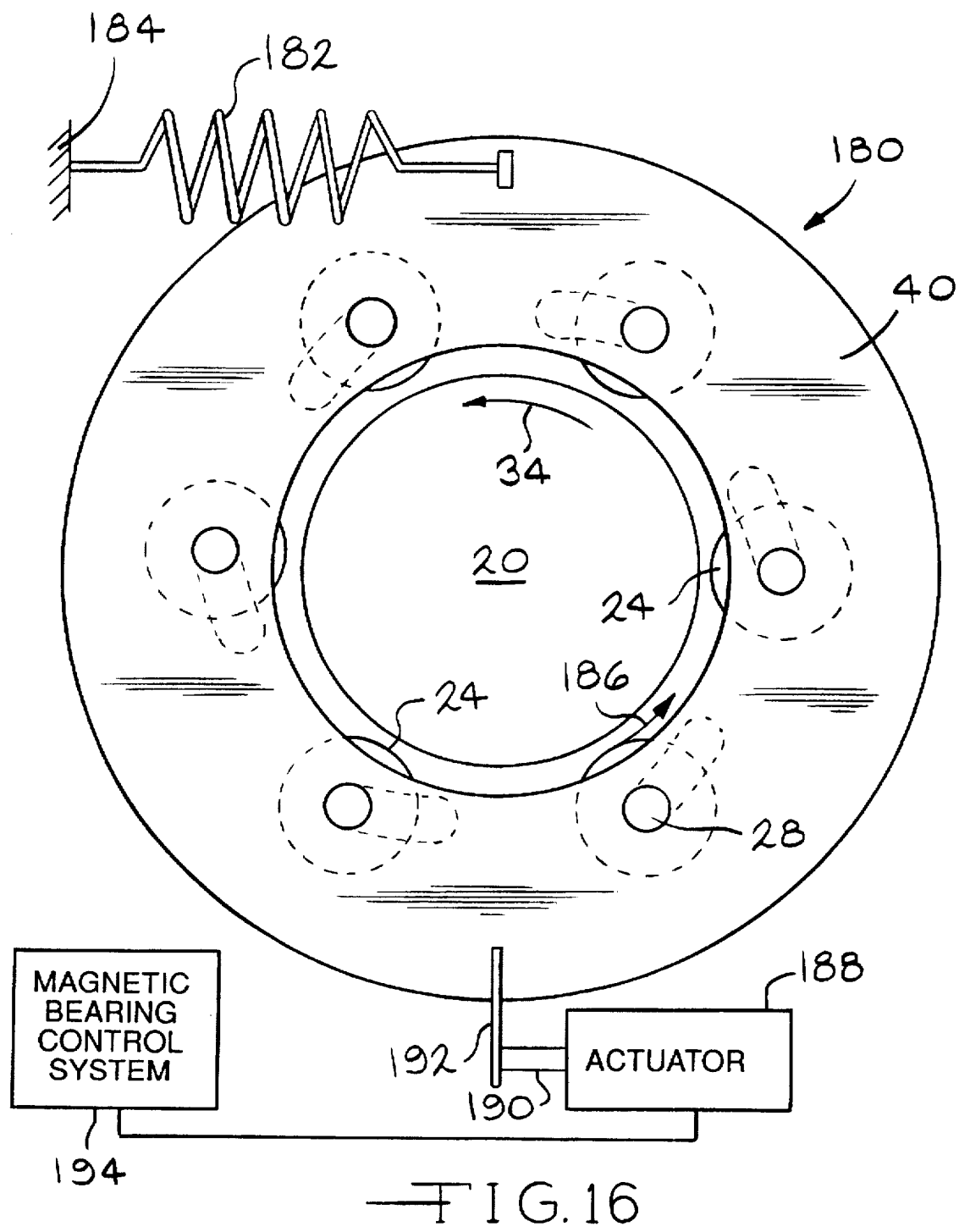
FIG. 16 is a view similar to that of FIG. 15 illustrating another embodiment of the present invention.

Referring to FIG. 16, there is illustrated generally at 180 another alternative embodiment of the auxiliary bearing of the present invention wherein a coil or torsional-type spring, illustrated at 182, is mounted at one end to a drive ring 40 and at the other end to ground 184 to maintain the drive ring 40 under tension and thereby aid in closing the clearance 26 (the spring 182 tends to rotate the drive ring 40 in the direction 34 of rotor rotation). When the rotor 20 makes contact with the rollers 24, the force of spring 182 is added to the traction force, illustrated at 186, to provide a strong closing force. An actuator, illustrated at 188, has an arm 190 which is operable to press against a lever 192 which is suitably engageable with the drive ring 40. The actuator 188 is electrically connected to the magnetic bearing control system, illustrated at 194, to operate to effect engagement of the lever 192 with the drive ring 40 to prevent the auxiliary bearing 180 from closing when the magnetic bearing is normally assuming the rotor load. When the magnetic bearing loses control of the rotor 20 (in the event of power failure, faulty instrumentation, excessive shock or vibrations, or any other reasons), the actuator 188, in response to the resulting signals (or lack thereof) from the magnetic bearing control system 194, is caused to release the force applied to the lever to allow the drive rings 40 to rotate, as aided by spring or springs 182, and close the clearance 26. When the magnetic bearing regains control, the magnetic bearing control system 194 signals the actuator 188 to again exert force on the lever 192 to force the auxiliary bearing 180 to return to the open position providing clearance 26.

As previously discussed, an auxiliary bearing may be internal of a tubular rotor. Referring to FIGS. 17 and 18, there is illustrated generally at 200 an auxiliary bearing suitably mounted such as by hub 203 internally within a tubular rotor 202 which rotates in the direction illustrated at 204. The auxiliary bearing 200 includes a plurality of perhaps 10 circumferentially spaced rollers 24 mounted on bearings 25 which are in turn mounted on stub shafts 28, and the stub shafts are received in slots 32 and 44 of support plates 30 and drive rings 40 respectively for movement from radially inner to radially outer positions for closing the clearance 26.

Figure 19:
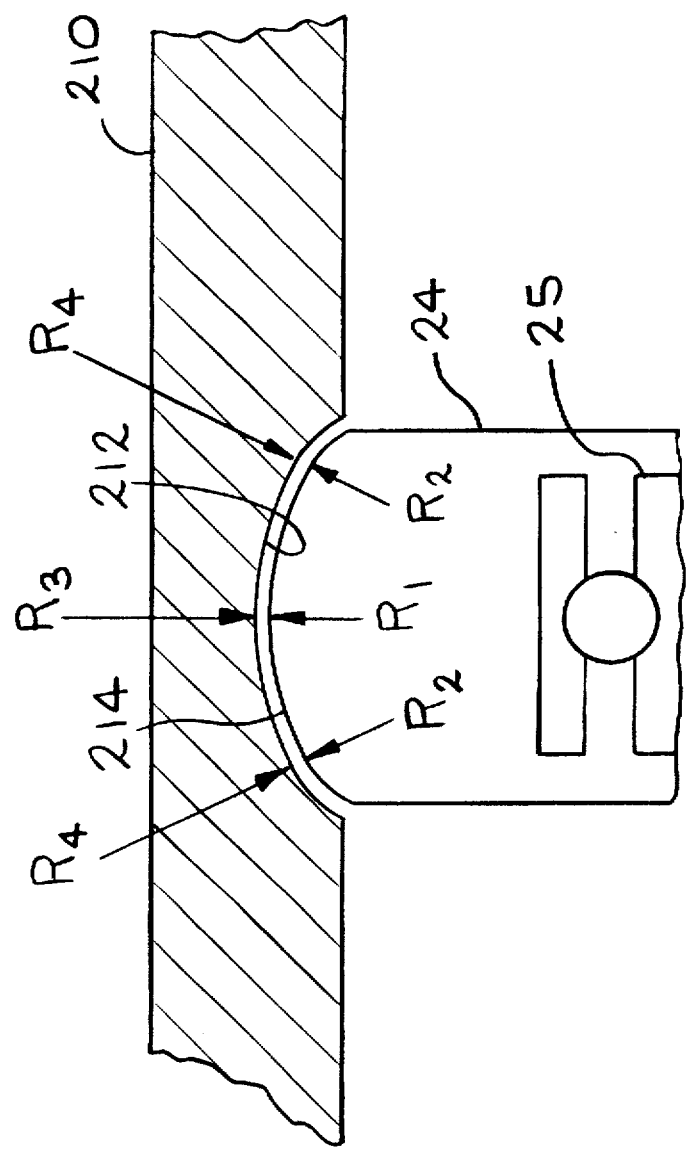
FIG. 19 is a schematic view illustrating a relation between a roller and the corresponding sleeve recess in a bearing in accordance with the present invention for providing thrust as well as radial support.

Referring to FIG. 19, there is illustrated at 210 a wear resistant sleeve for a rotor which is similar to sleeve 140 in FIG. 13 except that sleeve 210 is provided for use with a plurality of single rollers 24 in an auxiliary bearing in accordance with the present invention for providing thrust (axial) as well as radial support. The roller periphery 214 is rounded, and the sleeve 210 has a circumferentially-extending recess 212 which is rounded complementarily to receive the roller 24. Thus, the roller peripheral surface 214 has a radius $R_1$ centrally thereof and a radius $R_2$ to each side thereof, and the recess 212 has a radius $R_3$ centrally thereof and a radius $R_4$ to each side thereof, radius $R_1$ being equal to radius $R_3$, and radius $R_2$ being equal to radius $R_4$.

It should be understood that, while the present invention has been described in detail herein including the description of various embodiments, the invention can be embodied otherwise without departing from the principles thereof, and such other embodiments are meant to come within the scope of the present invention as defined by the appended claims.

What is claimed is:

1. An auxiliary bearing for temporarily receiving rotor load comprising a plurality of circumferentially spaced roller means, means for effecting movement of at least some of said roller means between first radial positions respectively affording clearance between said roller means and the rotor and second radial positions respectively for receiving by said roller means of rotor load, and means responsive to contact by the rotor with at least one of said roller means during rotation of the rotor for effecting movement of all of said at least some roller means from said first radial positions toward said second radial positions respectively for closing said clearance and receiving by all of said roller means the rotor load.

2. An auxiliary bearing according to claim 1 further comprising means for biasing movement of said at least some roller means to said first radial positions.

3. An auxiliary bearing according to claim 1 further comprising means for urging said roller means to said second radial positions, means responsive to signals from a main bearing control system for restraining said urging means, and means for releasing said restraining means during failure of main bearings to receive the rotor load.

4. An auxiliary bearing according to claim 1 further comprising means for receiving thrust loads.

5. An auxiliary bearing according to claim 4 wherein said roller means comprises a plurality of rollers having axes which are skewed relative to the rotor axis in alternate opposed directions relative to each other.

6. An auxiliary bearing according to claim 5 wherein said roller means further comprises a plurality of side-by-side angular contact ball bearing means movable axially relative to each other and on which said rollers are mounted and means for biasing said ball bearing means to positions distant from each other.

7. An auxiliary bearing according to claim 4 wherein said roller means comprises a plurality of side-by-side rollers movable axially relative to each other in response to thrust loads and means for biasing said rollers to positions distant from each other and for dampening movements of said rollers toward each other in response to thrust loads.

8. An auxiliary bearing for temporarily receiving rotor load comprising a pair of spaced plates, a plurality of stub shafts, a plurality of roller means mounted on said stub shafts respectively, a plurality of circumferentially and radially extending slot means in said plates for receiving said stub shafts in circumferentially spaced relation relative to the rotor and for accommodating movement of said stub shafts between first radial positions respectively affording clearance between said roller means and the rotor and second radial positions respectively for receiving rotor load, at least one circumferentially extending member which is mounted for movement circumferentially of the rotor and which has a plurality of radially extending slot means for receiving all of said stub shafts respectively for effecting movement of all of said roller means from said first radial positions toward said second radial positions respectively in response to transient contact by the rotor during rotation thereof with at least one of said roller means for closing said clearance and receiving by all of said roller means the rotor load.

9. An auxiliary bearing according to claim 8 further comprising a plurality of circumferentially spaced roller means having fixed positions for sharing the rotor load with said roller means which are mounted on said stub shafts.

10. An auxiliary bearing according to claim 8 wherein said plate slot means are positioned so that axes of said stub shafts are skewed relative to an axis of the rotor in alternately opposed directions relative to each other.

11. An auxiliary bearing according to claim 8 further comprising means for applying tension to said member for movement thereof in a direction circumferentially for movement of said roller means toward said radially inner positions respectively, means for restraining movement of said member in said direction circumferentially, and means responsive to main bearing failure for releasing said restraining means.

12. An auxiliary bearing according to claim 8 further comprising means for biasing movement of said at least some roller means to said first radial positions.

13. An auxiliary bearing according to claim 8 further comprising means for receiving thrust loads.

14. An auxiliary bearing according to claims 13 wherein said roller means comprises a plurality of rollers having axes which are skewed relative to the rotor axis in alternate opposed directions relative to each other.

15. An auxiliary bearing according to claim 13 wherein said roller means comprises a plurality of side-by-side rollers movable axially relative to each other in response to thrust loads and means for biasing said rollers to positions distant from each other and for dampening movements of said rollers toward each other in response to thrust loads.

16. An auxiliary bearing according to claim 15 wherein said roller means further comprises a plurality of side-by-side angular contact ball bearing means movable axially relative to each other and on which said rollers are mounted and means for biasing said ball bearing means to positions distant from each other.

* * * * *